United States Patent
Yamada et al.

(10) Patent No.: US 10,045,095 B2
(45) Date of Patent: Aug. 7, 2018

(54) COMMUNICATION PROCESSING DEVICE, COMMUNICATION METHOD, AND COMMUNICATION SYSTEM

(71) Applicant: Hitachi, Ltd., Chiyoda-ku, Tokyo (JP)

(72) Inventors: Hiromichi Yamada, Tokyo (JP); Tsutomu Yamada, Tokyo (JP); Tatsuya Maruyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 122 days.

(21) Appl. No.: 15/182,692

(22) Filed: Jun. 15, 2016

(65) Prior Publication Data

US 2017/0094375 A1 Mar. 30, 2017

(30) Foreign Application Priority Data

Sep. 30, 2015 (JP) .................................. 2015-193587

(51) Int. Cl.
*H04Q 3/56* (2006.01)
*H04L 29/06* (2006.01)
(Continued)

(52) U.S. Cl.
CPC ............. *H04Q 3/56* (2013.01); *H04L 45/745* (2013.01); *H04L 47/23* (2013.01); *H04L 49/351* (2013.01); *H04L 69/22* (2013.01)

(58) Field of Classification Search
CPC ..... H04L 45/745; H04L 47/23; H04L 49/351; H04L 69/22; H04Q 3/56
(Continued)

(56) References Cited

U.S. PATENT DOCUMENTS 6,891,397 B1 * 5/2005 Brebner .................. H04L 45/00
326/38
2008/0031267 A1 * 2/2008 Imao ....................... H04L 69/16
370/401
(Continued)

FOREIGN PATENT DOCUMENTS

JP 2000-174844 A 6/2000

*Primary Examiner* — Afsar M Qureshi
(74) *Attorney, Agent, or Firm* — Crowell & Moring LLP (57) ABSTRACT

Provided are a communication processing device and a communication system, capable of securely updating a communication protocol process with a simple configuration and technique, while continuing communication. A communication processing device, which is connected to a communication network, includes a programmable logic device in which partial rewriting of a logic circuit is possible, during an operation of a host device in the communication network, in which the programmable logic device includes at least two communication processing circuits of which each performs a communication protocol process, and in which one communication processing circuit is operable due to switching, a first communication processing circuit performs communication, and a second communication processing circuit is on standby, updating means for downloading logic circuit data of an updated communication protocol process, from the communication network, and performing a circuit configuration for the second communication processing circuit, a flag that indicates whether or not the circuit configuration for the second communication processing circuit is finished, and by which a circuit configuration state is able to be read to the host device side through communication, and a register that is intended for switching to any one communication processing circuit to be used, and is writable from the host device side through communication.

5 Claims, 11 Drawing Sheets

(51) Int. Cl.
*H04L 12/931* (2013.01)
*H04L 12/741* (2013.01)
*H04L 12/815* (2013.01)

(58) Field of Classification Search
USPC ........................................................ 370/250
See application file for complete search history.

(56) References Cited

U.S. PATENT DOCUMENTS

| | | | |
|---|---|---|---|
| 2008/0059755 A1* | 3/2008 | Lee ..................... | H04L 12/4641 |
| | | | 711/217 |
| 2008/0259837 A1* | 10/2008 | Thoukydides ........ | H04W 16/14 |
| | | | 370/311 |
| 2011/0194546 A1* | 8/2011 | Sanguinetti .......... | H04B 1/0053 |
| | | | 370/338 |
| 2012/0177047 A1* | 7/2012 | Roitshtein ............... | H04L 69/22 |
| | | | 370/392 |
| 2013/0318271 A1* | 11/2013 | Schlansker ............. | H04L 49/40 |
| | | | 710/300 |
| 2015/0372837 A1* | 12/2015 | Nishiyama .......... | H04L 12/4015 |
| | | | 370/438 |
| 2018/0048714 A1* | 2/2018 | Kanai ..................... | H04L 69/08 |

* cited by examiner

COMMUNICATION PROCESSING DEVICE, COMMUNICATION METHOD, AND COMMUNICATION SYSTEM

TECHNICAL FIELD

The present invention relates to a communication processing device, a communication method, and a communication system, which are used in various types of communication networks.

BACKGROUND ART

As various types of communication networks, for example, since a host device and a plurality of control devices perform communication through local area network (LAN) ports, and various control devices and the like perform communication with each other, in power systems or industrial systems, a communication network is configured with a communication cable and a communication processing device (for example, a switch).

In this case, communication is performed according to the communication protocol that defines the terms related to communication on a communication network. Further, data to be communicated is not transmitted all at once, but rather the data is transmitted by being divided into units called packets. A header including a destination address and a source address is added to the packets, in addition to the data to be transmitted.

The communication processing device that connects the host device and the control device to the communication network includes a plurality of ports, checks the header of the received packet, selects a port for transmission to the destination address, and transmits a packet. A communication process is likely to be performed in combination with a central processing unit (CPU) and dedicated large scale integration (LSI). Examples of the dedicated LSI include an application specific integrated circuit (ASIC), a field programmable gate array (FPGA), and the like. Since the dedicated LSI is used, the speed of the communication process can be increased.

Among these, while the logic circuit in the ASIC is fixed, the FPGA is characterized in that the user can define or change the logic circuit. Although the FPGA has logic circuit information in a configuration random access memory (CRAM) in the inside, the FPGA in which the CRAM is formed with a static random access memory (SRAM) is referred to as an SRAM-type FPGA. The SRAM-type FPGA starts an operation after the logic circuit is configured by reading logic circuit information which is stored in the external flash memory after power is turned on, and writing the logic circuit information to a CRAM. Among the SRAM-type FPGAs, a dynamic partial reconfigurable FPGA can be referred to as a programmable logic device in which the logic circuit can be partially rewritten during an operation.

Meanwhile, recent power systems and industrial systems are configured such that an internet protocol (IP) communication network has been used for the communication network of the system. As a result, in the power systems and industrial systems, there is a concern about the threat of cyberattacks in the future, and thus it is considered that it is necessary to strengthen the security of the communication network.

As a countermeasure against such cyberattacks, in a case where a communication packet is determined to be due to cyberattacks, it is necessary to discard the packet and inform the host system of this fact. Since the above operations are performed by the communication protocol process, it is possible to prepare the processing function for threats which have been found in advance, but an additional function is required in the communication protocol process, with respect to new threats.

As a solution for the problem, PTL 1 describes a configuration method for a communication processing device which rewrites the control circuit of the FPGA depending on the communication contents at any time, and updates the control circuit dynamically without interrupting communication.

CITATION LIST

Patent Literature

PTL 1: JP-A-2000-174844

SUMMARY OF INVENTION

Technical Problem

According to PTL 1, communication control circuits are provided in two FPGAs, network communication is performed by a switching circuit switching the outputs thereof, a new communication function is configured in the other FPGA, while one FPGA performs communication, and thus the switching circuit is configured to switch the outputs of the FPGAs.

The technology of PTL 1 describes a method by which the communication processing device by itself performs switching between the FPGAs, but there is no disclosure about synchronizing and switching all of the communication processing devices constituting the communication network. If the communication processing devices discretely perform the switching between the FPGAs, the protocol processes are different at the transmitting side and the receiving side, such that there is a problem that communication cannot be performed correctly.

In addition, in PTL 1, since a plurality of FPGAs are provided, the communication processing device is unavoidably expensive.

From the above, according to the present invention, it is possible to provide a communication processing device, a communication method, and a communication system capable of securely updating a communication protocol process with a simple configuration and technique, while continuing communication.

Solution to Problem

In order to solve the above problem, according to an aspect of the present invention, there is provided a communication processing device which is connected to a communication network, and includes a programmable logic device in which partial rewriting of a logic circuit is possible, during an operation of a host device in the communication network, in which the programmable logic device includes at least two communication processing circuits of which each performs a communication protocol process, and in which one communication processing circuit is operable due to switching, a first communication processing circuit performs communication, and a second communication processing circuit is on standby, updating means for downloading logic circuit data of an updated communication protocol process, from the communication network, and performing a circuit configuration for the second communication processing circuit, a flag that indicates whether or not the circuit configuration for the second communication processing circuit is finished, and by which a circuit configuration state is able to be read to the host device side through communication, and a register that is intended for switching to any one communication processing circuit to be used, and is writable from the host device side through communication.

Further, according to another aspect of the present invention, there is provided a communication method of a communication system including a plurality of communication processing devices which are connected to a communication network, in which a host device which is connected to one of the communication processing devices, and controls a communication protocol process change of the communication processing circuit transmits logic circuit data of an updated communication protocol process, to another communication processing device, transmits a partial rewriting instruction of logic circuit data which is transmitted to the programmable logic device, reads a flag indicating whether partial rewriting is finished, from the programmable logic device, and checks that the partial rewriting is finished in all of the programmable logic devices, and performs a setting of using an updated communication protocol processing circuit, for all of the programmable logic devices, through communication.

Further, according to still another aspect of the present invention, there is provided a communication system in which a host device and a control device are connected to a communication network through a communication processing device, in which the communication processing device includes a programmable logic device in which partial rewriting of a logic circuit is possible, during an operation of the host device, and the programmable logic device includes at least two communication processing circuits of which each performs a communication protocol process, and in which one communication processing circuit is operable due to switching, a first communication processing circuit performs communication, and a second communication processing circuit is on standby, updating means for downloading logic circuit data of an updated communication protocol process, from the communication network, and performing a circuit configuration for the second communication processing circuit, a flag that indicates whether or not the circuit configuration for the second communication processing circuit is finished, and by which a circuit configuration state is able to be read to the host device side through communication, and a register that is intended for switching to any one communication processing circuit to be used, and is writable from the host device side through communication.

Advantageous Effects of Invention

According to the present invention, it is possible to securely update a communication protocol process with a simple configuration and technique, while continuing communication.

DESCRIPTION OF EMBODIMENTS

Hereinafter, embodiments of the present invention will be described with reference to the drawings.

Embodiment

Figure 1:
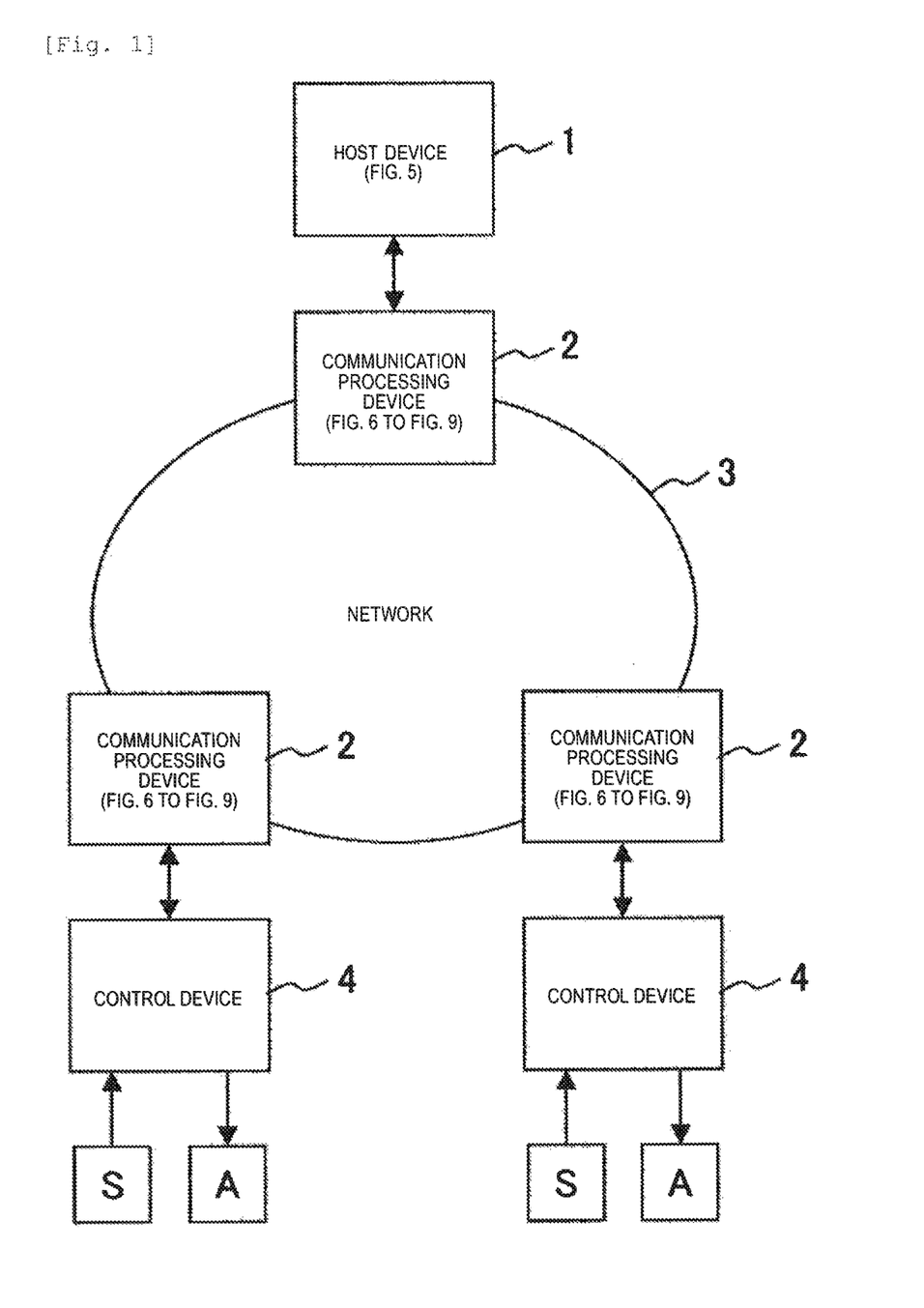
FIG. 1 is a diagram illustrating an entire configuration of a communication system in which a host device 1 and a control device 4 perform network communication through a communication processing device 2.

FIG. 1 is an entire configuration diagram of a communication system in which a host device and a control device perform network communication through a communication processing device.

In the communication system of FIG. 1, a host device 1 provided in the center and a plurality of control devices 4 provided in a plant site or the like are connected to a communication network 3 through respective communication processing devices 2, and perform communication. A sensor S present in the plant site, which is provided on the control device 4 side, measures quantities in a process such as a voltage, a current, a temperature, and vibration, which are not illustrated. An actuator A is a relay or a motor as the operation end of the field device.

The control device 4 in the field converts an analog output that is detected by the sensor S into a digital output, based on a predetermined cycle, and stores the digital output therein. The host device 1 in the center reads data of the sensor S from the control device 4 through communication, determines the control details for the entire system, and forwards the control details for the actuator A to the control device 4.

The communication is performed between the host device 1 and the control device 4, and between the control devices 4 with each other. The communication processing device 2 is connected to the host device 1, the control devices 4, and other communication processing devices 2, over a communication network 3. If a packet is received from the communication network 3, each communication processing device 2 checks the header in the packet and determines whether or not the communication is addressed to itself, acquires the packet if it is addressed to itself, and transfers the packet from the port for transmission or discards the packet if it is not addressed to itself.

Incidentally, although the example of FIG. 1 illustrates a case where the host device 1 and the control device 4 are connected to the communication network through respective communication processing devices, a plurality of control devices may be connected to the communication network in a wide sense. The host device is also a control device, and is referred to as a control device having a function as a host device.

Figure 2:
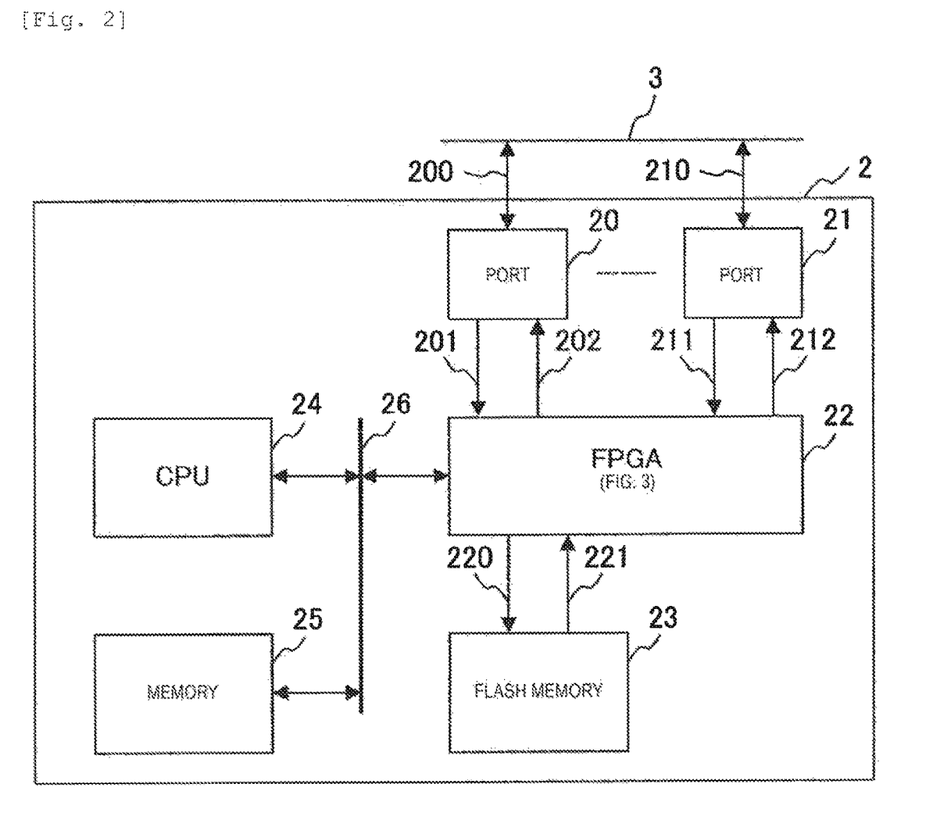
FIG. 2 is a block diagram illustrating a schematic configuration of the communication processing device 2.

FIG. 2 is a block diagram illustrating a schematic configuration of the communication processing device. The communication processing device 2 includes a plurality of ports 20 and 21, and performs network communication through the communication network 3. 200 is a network interface of the port 20, and 210 is a network interface of the port 21.

A field programmable gate array (FPGA) 22 receives a packet from an input interface 201 of the port 20, and transmits a packet to the output interface 202 of the port 20. Similarly, a packet is received from an input interface 211 of the port 21, and transmitted to an output interface 212 of the port 21. In addition, since the FPGA 22 is an LSI in which the user can freely execute a programming job and rewriting is possible, the FPGA 22 has a characteristic in which circuits can be easily changed.

A flash memory 23 stores the logic circuit information of the FPGA 22. After power is turned on, the FPGA 22 reads logic circuit information from the flash memory 23 and writes the information to a CRAM in the FPGA 22, and the FPGA 22 starts an operation after the logic circuit is configured. This means that the processing content of the FPGA 22 is determined by the logic circuit information stored in the flash memory 23 and can be appropriately changed.

A CPU 24 executes the software process of the communication processing device 2. A memory 25 stores the program and data which are executed and processed by the CPU 24, and stores the data processed by the FPGA 22. The FPGA 22, the CPU 24, and the memory 25 are connected through a bus 26.

Although it is not illustrated in FIG. 2, the control device 4 is connected to the communication processing device 2 through an appropriate communication path, transmits the command of the host device 1 to the control device 4, and transmits the measurement results in the field of the control device 4 to the host device 1. The communication path between the communication processing device 2 and the control device 4 is established by, for example, the bus 26.

Figure 3:
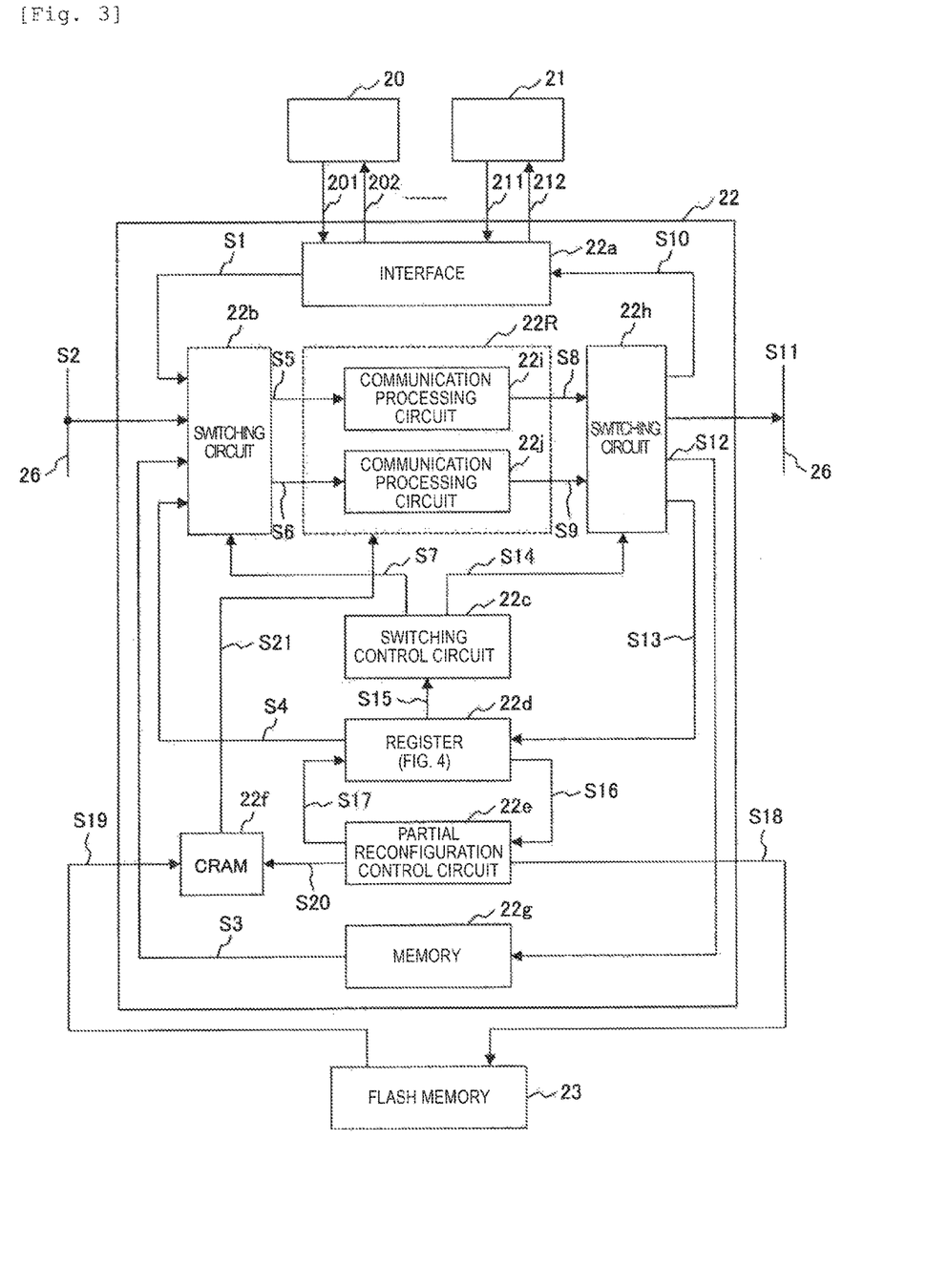
FIG. 3 is a block diagram illustrating a configuration of an FPGA 22 which is a configuration component of the communication processing device 2.

FIG. 3 is a block diagram of an FPGA which is a configuration component of the communication processing device. A region 22R which is present in the inside of the FPGA 22 is referred to as a variable region, and is a region that is set so as to be dynamically reconfigurable. The region other than the variable region 22R is referred to as a fixed region, and is a region which is set so as not to be dynamically reconfigurable. In the embodiment of the present invention, it is assumed that a communication processing circuit 22i and a communication processing circuit 22j are provided in the variable region 22R, but the number of communication processing circuits that are provided in the variable region 22R is not limited thereto. Switching circuits 22b and 22h, an interface 22a, a switching control circuit 22c, a register 22d, a memory 22g, a partial reconfiguration control circuit 22e, and a CRAM 22f are provided in the fixed region of the FPGA 22.

In the communication processing device including the FPGA in FIG. 3, communication based on the communication protocol that is provided in the communication processing circuit 22i in the variable region 22R is executed at present. The communication protocol that is provided in the communication processing circuit 22i is the existing communication protocol which is vulnerable to attacks from external internet sources. In the present invention, communication reinforcement is intended by transmitting information containing a new communication protocol, in which vulnerability is eliminated, to a plurality of communication processing devices from the host device 1. The configuration and procedures will be described below.

Among these, the interface 22a receives the packet from the input interfaces 201 and 211 of the ports 20 and 21, and forwards the packet to the switching circuit 22b on the inlet side of the variable region 22R, as the output S1. In addition, a packet that is output by the switching circuit 22h on the outlet side of the variable region 22R is received as the input S10, and is transmitted to the output interfaces 202 and 212 of the ports 20 and 21.

The switching circuit 22b on the inlet side of the variable region 22R receives the output S2 of the bus 26 of the communication processing device 2, the output S3 of the memory 22g, and the output S4 of the register 22d, in addition to the output S1 of the interface 22a, and is connected to the input S5 of the communication processing circuit 22i or the input S6 of the communication processing circuit 22j in a switchable manner. The switching is performed by using the switching control signal S7 that is output by the switching control circuit 22c.

In contrast, the switching circuit 22h on the outlet side of the variable region 22R selects either the output S8 of the communication processing circuit 22i or the output S9 of the communication processing circuit 22j, and is connected to the input S10 of the interface 22a, the input S11 of the bus 26 of the communication processing device 2, the input S13 of the register 22d, and the input S12 of the memory 22g, in a switchable manner. The switching by the switching circuit 22h on the outlet side of the variable region 22R is performed by using the switching control signal S14 that is output by the switching control circuit 22c.

The switching control circuit 22c outputs the switching control signal S7 of the switching circuit 22b on the inlet side and the switching control signal S14 of the switching circuit 22h on the outlet side, in response to the switching control signal S15 that is output by the register 22d.

The register 22d includes a register for temporarily storing and controlling the data that is processed by the communication processing circuit 22i or the communication processing circuit 22j. The register input S13 of the register 22d includes a read/write command, the register address, and the write data of the register 22d. The register output S4 of the register 22d includes the read data of the register 22d.

The memory 22g temporarily stores the data that is processed by the communication processing circuit 22i or the communication processing circuit 22j. The memory input S12 of the memory 22g includes the read/write command, the memory address, and the write data of the memory 22g. The memory output S3 of the memory 22g includes the read data of the memory 22g.

The partial reconfiguration control circuit 22e performs control for forming a circuit, in the variable region 22R of the FPGA 22. If the reconfiguration instruction signal S16 is received from the register 22d, the partial reconfiguration control circuit 22e outputs a read command and a memory address as the output S18 to the external flash memory 23. The logic circuit information is read from the flash memory 23 as an input S19 in response thereto, and is recorded in the CRAM 22f. The partial reconfiguration control circuit 22e gives the output signal S20 to the CRAM 22f, and transmits the logic circuit information that is recorded in the CRAM 22f to the variable region 22R of the FPGA 22, as the output S21.

In the configuration of the FPGA of FIG. 3, the communication processing circuit 22i and the communication processing circuit 22j which are formed in the variable region 22R designate a processing destination that processes the received signal the next time, or determine a transmission source of a signal to be transmitted to the outside, in addition to checking the address of the received signal. These functions are executed, for example, by using the communication processing circuit 22i as a main system, and the communication processing circuit 22j as a standby system, and thus, the logic circuit information is configured in the communication processing circuit 22i which is the main system, and the logic circuit information is not configured in the communication processing circuit 22j.

The data which is a processing result by the communication processing circuit 22i that is the main system is switched and transmitted to the interface 22a, the bus 26, the memory 22g, and the register 22d as the output signals S10, S11, S12, and S13, by the switching circuit 22h. Further, the input data pieces that are given to the communication processing circuit 22i which is the main system are S1, S2, S3, and S4, and are transmitted from the interface 22a, the bus 26, the memory 22g, and the register 22d, which are respective transmission sources, are switched by the switching circuit 22b, and are retrieved to the communication processing circuit 22i.

The switching control circuit 22c uses the communication processing circuit 22i as a main system and the communication processing circuit 22j as a standby system at a normal time, and when the switching condition is satisfied, the switching control circuit 22c gives the outputs S7 and S14 for commanding the switching to the switching circuit 22b on the inlet side and the switching circuit 22h on the outlet side, in order to perform switching to use the communication processing circuit 22i as the standby system and the communication processing circuit 22j as the main system.

Figure 4:
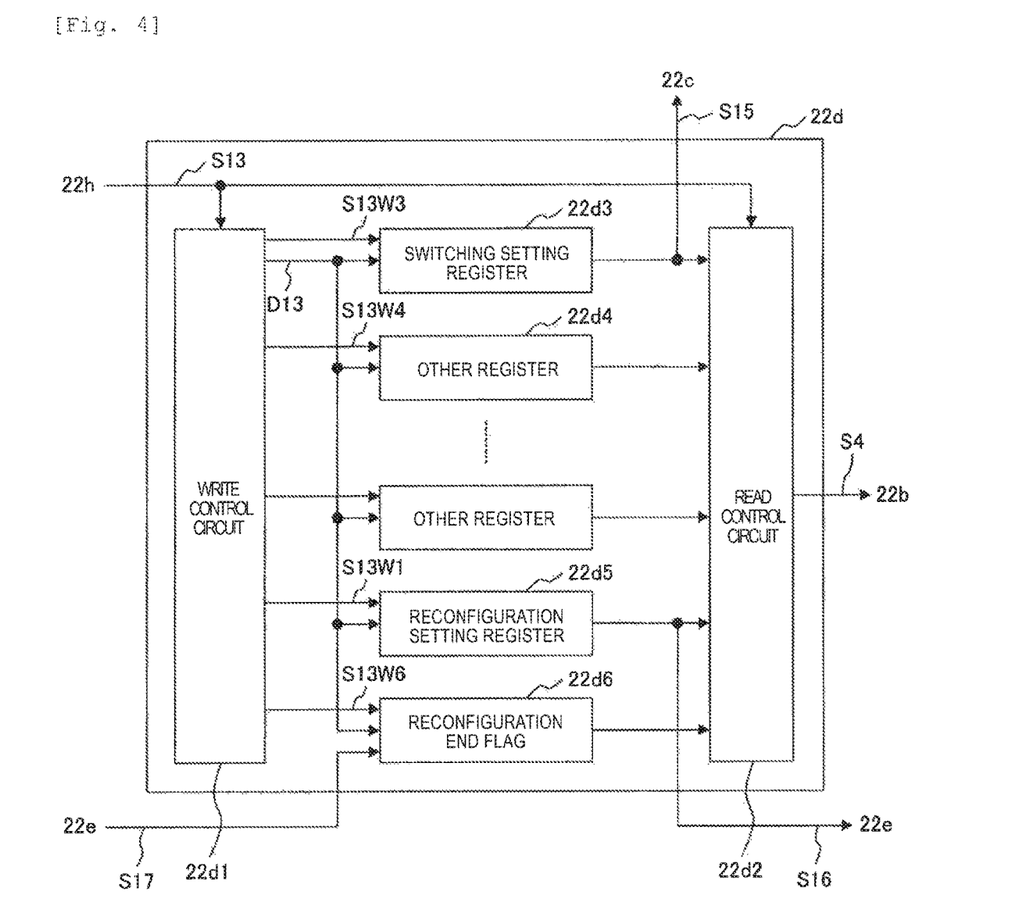
FIG. 4 is a block diagram illustrating an internal configuration of a register 22*d*.

FIG. 4 is a block diagram illustrating an internal configuration of the register 22d. The register 22d includes a write control circuit 22d1, a read control circuit 22d2, and a plurality of registers. The plurality of registers are configured with a switching setting register 22d3, a reconfiguration setting register 22d5, a reconfiguration end flag register 22d6, and other registers 22d4.

Among these, the switching setting register 22d3 is intended for setting which one of the communication processing circuit 22i and the communication processing circuit 22j that constitute the variable region 22R of the FPGA 22 is used to perform a communication process. The reconfiguration setting register 22d5 is intended for setting the partial reconfiguration of the FPGA 22. Specifically, the reconfiguration setting register 22d5 sets the start of the partial reconfiguration, the address of the flash memory 23 in which the logic circuit information for partial reconfiguration is stored, and the address of the CRAM 22f on which logic circuit information is written. The reconfiguration end flag register 22d6 is a register that indicates whether or not the reconfiguration is finished. A plurality of other registers 22d4 which are provided are registers that temporarily store the data pieces which are processed by the communication processing circuits 22i and 22j.

The write control circuit 22d1 decodes the input signal S13, and writes the input signal to the registers 22d3 to 22d6. S13W3 to S13W6 are signals to be written to the respective registers 22d3 to 22d6, and D13 is write data. The read control circuit 22d2 decodes the input signal S13, selects the read data of the registers 22d3 to 22d6, and outputs the read data to the switching circuit 22b as the register output.

The output of the switching setting register 22d3 is the switching output S15 that is given to the switching control circuit 22c, and the output of the reconfiguration setting register 22d5 is the output S16 that is given to the partial reconfiguration control circuit 22e. Further, the reconfiguration end flag register 22d6 indicates the end of the reconfiguration, with the output S17 from the partial reconfiguration control circuit 22e.

Next, the procedure of changing work for the communication protocol process, which is performed between the host device 1 and the communication processing device 2, will be described with reference to the processing flowcharts of FIG. 5 to FIG. 9. In addition, FIG. 5 is a diagram mainly illustrating the processing contents by the host device 1 which instructs the change of the communication protocol process, and FIGS. 6 to 9 respectively illustrate corresponding processes that are performed by the communication processing device 2 in response to sequential processing requests from the host device 1.

Figure 5:
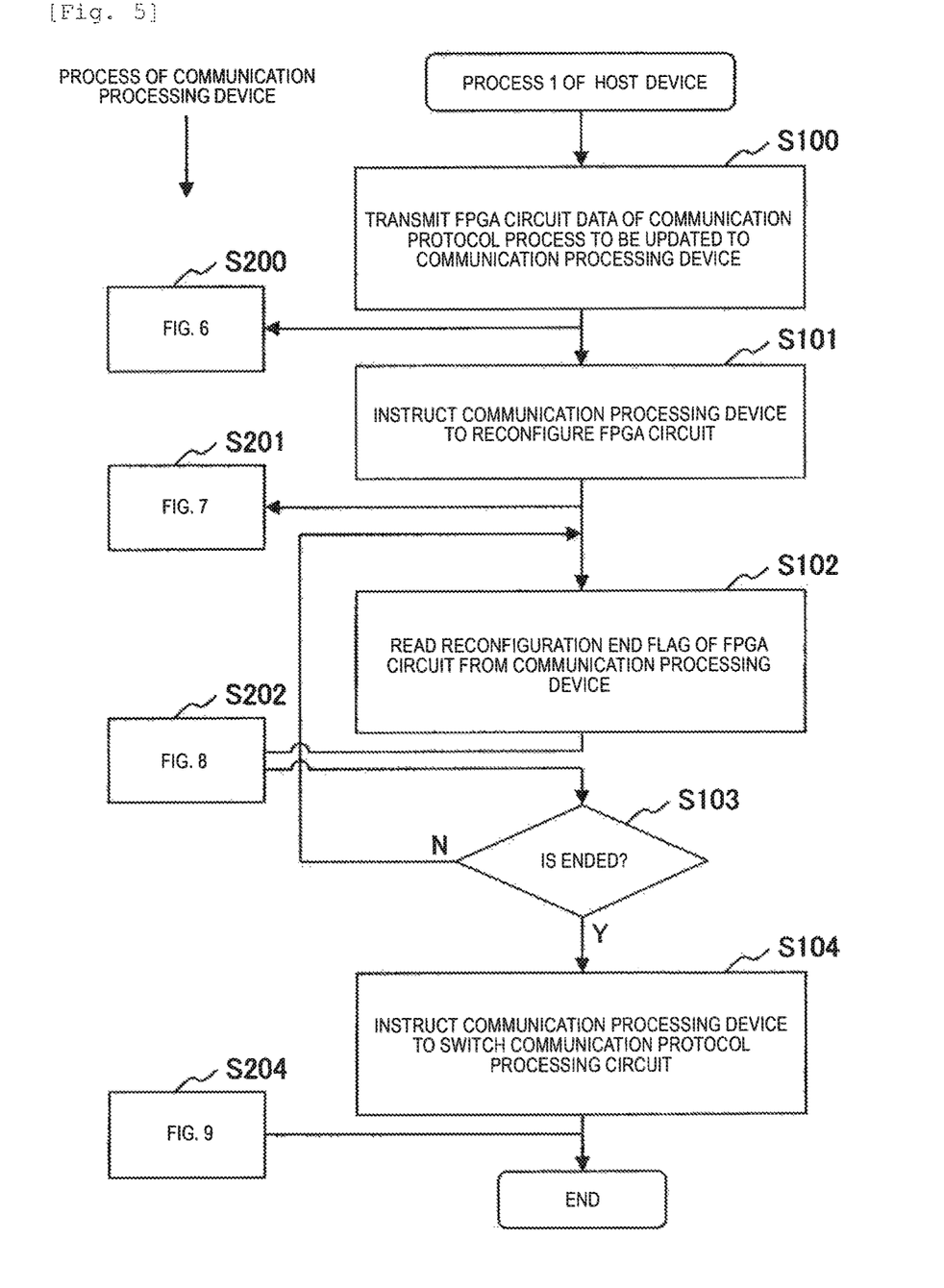
FIG. 5 is a diagram illustrating the process of a host device in the update of a communication protocol process.

In FIG. 5, the processing content by the host device 1 is illustrated on the right side, and the processing content by the communication processing device 2 is illustrated on the left side in contrast. Among these, the outline of the processing content by the host device 1 illustrated on the right side is as follows. First, in the first processing step S100, the FPGA circuit data of the communication protocol process to be updated is transmitted to the communication processing device 2. In the processing step S101, the reconfiguration of the FPGA circuit is instructed to the communication processing device 2. In the processing step S102, the reconfiguration end flag of the FPGA circuit is read from the communication processing device. In the processing step S103, it is checked whether or not the reconfiguration end flag indicates the end. Until the reconfiguration end flags of all of the communication processing devices indicate the end, the process of S102 is continued for the communication process which is not finished. In 103, if the reconfiguration end flags of all of the communication processing devices indicate the end, the process proceeds to S104, and the switching between the communication protocol processing circuits is instructed to the communication processing device.

In contrast, each communication processing device 2 responds as follows.

Figure 6:
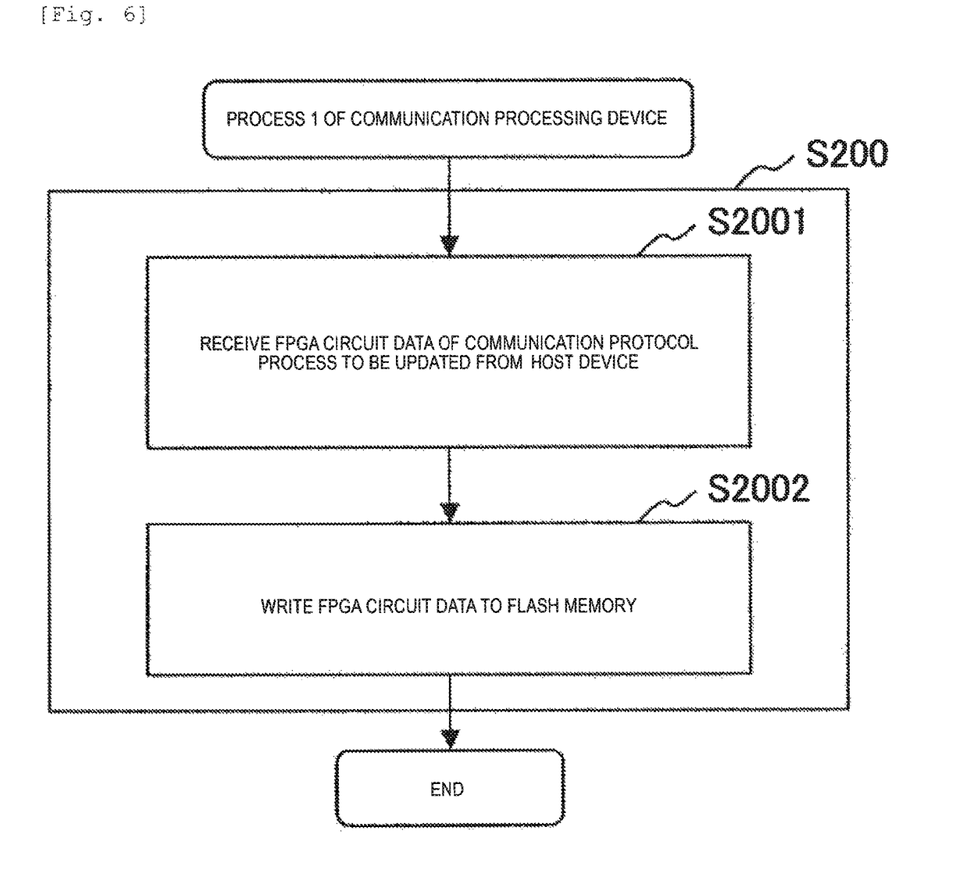
FIG. 6 is a flowchart of treatment 1 of the communication processing device in the update of the communication protocol process.

First, in the processing step S100 of the host device 1, the communication processing device 2 performs the processing step S200 of FIG. 6. FIG. 6 is a flowchart of treatment 1 of the communication processing device, in the updating of the communication protocol process. In the processing step S2001 of FIG. 6, the FPGA circuit data of the communication protocol process to be updated is received from the host device 1. In the next processing step S2002, the FPGA circuit data is written to the flash memory 23. If the flow of signals up to the writing of the FPGA circuit data to the flash memory 23 is described, the flow is S1→S8→S13→S16→S18, in FIGS. 3 and 4.

Figure 7:
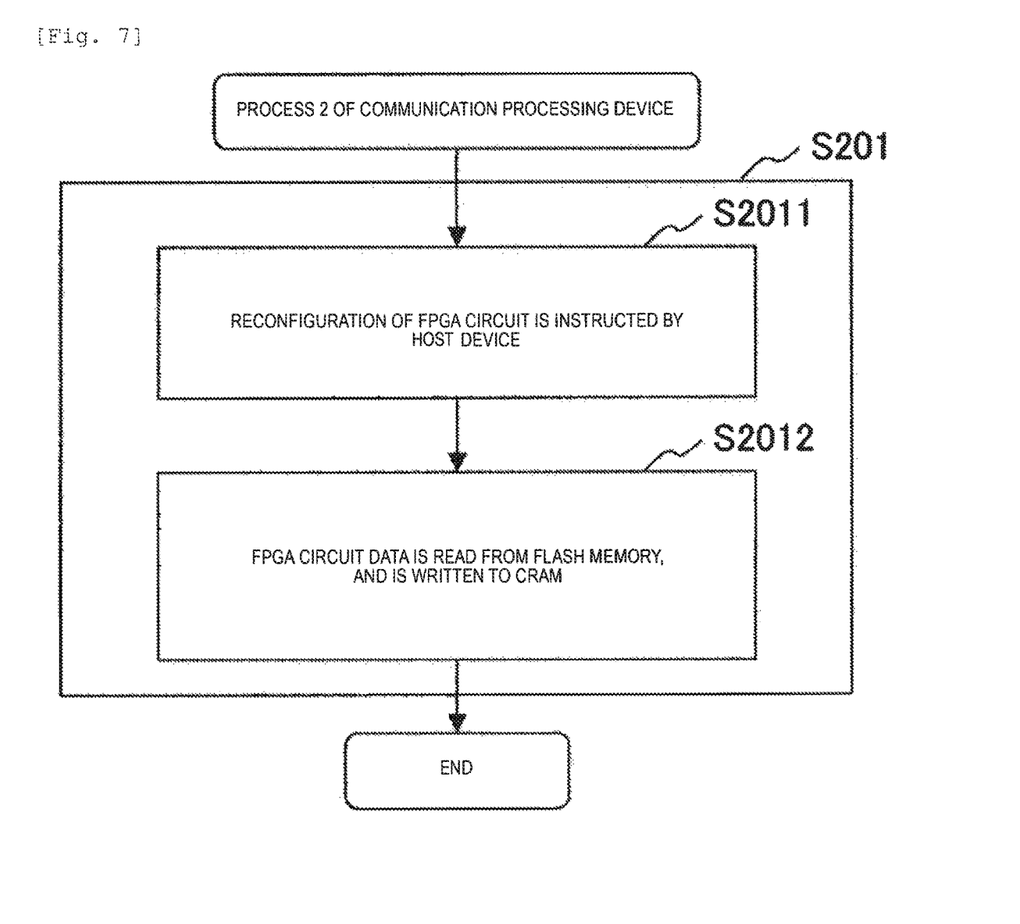
FIG. 7 is a flowchart of treatment 2 of the communication processing device in the update of the communication protocol process.

The communication processing device 2 performs the processing step S201 of FIG. 7, with respect to the processing step S101 of the host device 1. FIG. 7 is a flowchart of treatment 2 of the communication processing device, in the updating of the communication protocol process. In the processing step S2011 of FIG. 7, the reconfiguration of the FPGA circuit is instructed by the host device 1. In the processing step S2012, the FPGA circuit data is read from the flash memory 23, and is written to the CRAM 22f. Further, the partial reconfiguration control circuit 22e gives the output signal S20 to the CRAM 22f, transmits logic circuit information that is recorded in the CRAM 22f as an output S21 to the variable region 22R of the FPGA 22, and transmits and writes the logic circuit information to the communication processing circuit 22j on the standby side in the variable region 22R. Further, the partial reconfiguration control circuit 22e gives an output S17 that means the end at the time when the reconfiguration is finished. If the flow of the signals to be written to the CRAM 22f and the like is described, S19, S20, S21, and S17 in FIG. 3 correspond thereto.

Figure 8:
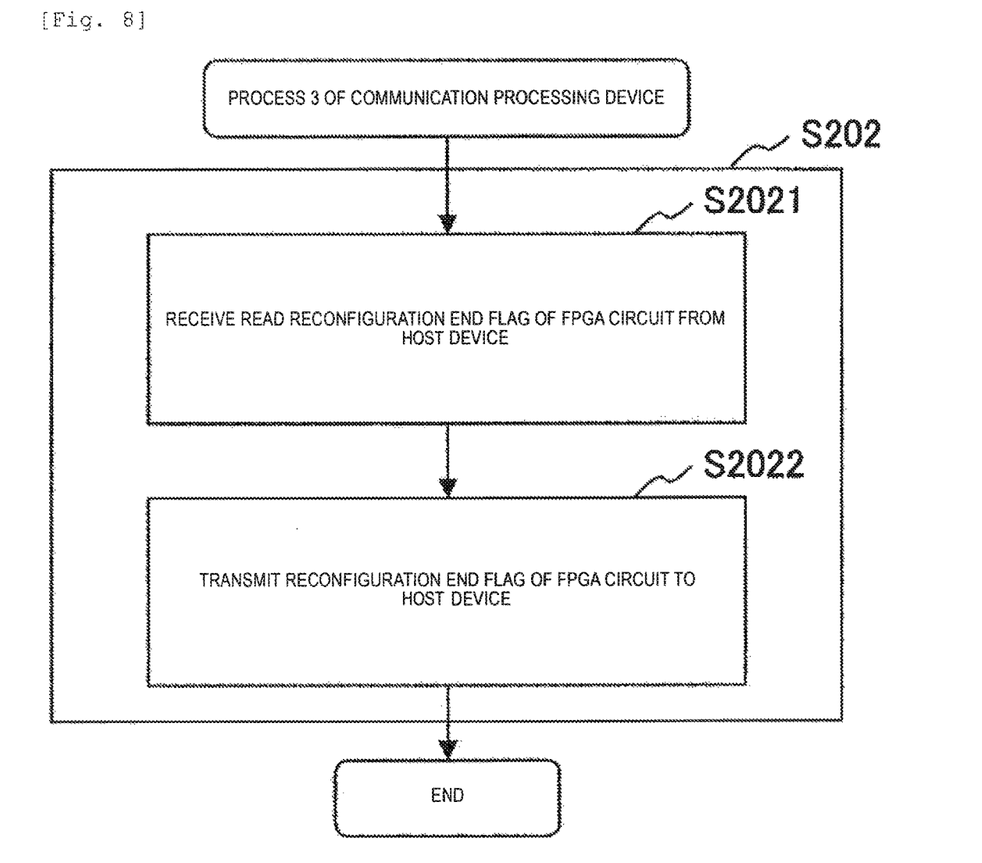
FIG. 8 is a flowchart of treatment 3 of the communication processing device in the update of the communication protocol process.

The communication processing device 2 performs the processing step S202 of FIG. 8, with respect to the processing step S102 of the host device 1. FIG. 8 is a flowchart of treatment 3 of the communication processing device, in the updating of the communication protocol process. In the processing step S2021 of FIG. 8, the read reconfiguration end flag S17 of the FPGA circuit is received from the host device 1. In the processing step S2012, the reconfiguration end flag 22d6 of the FPGA circuit is transmitted to the host device 1. If the flow of signals up to the transmission of the reconfiguration end flag 22d6 to the host device 1 is described, the flow is 22d6→S4→S8→S10, in FIGS. 3 and 4.

Figure 9:
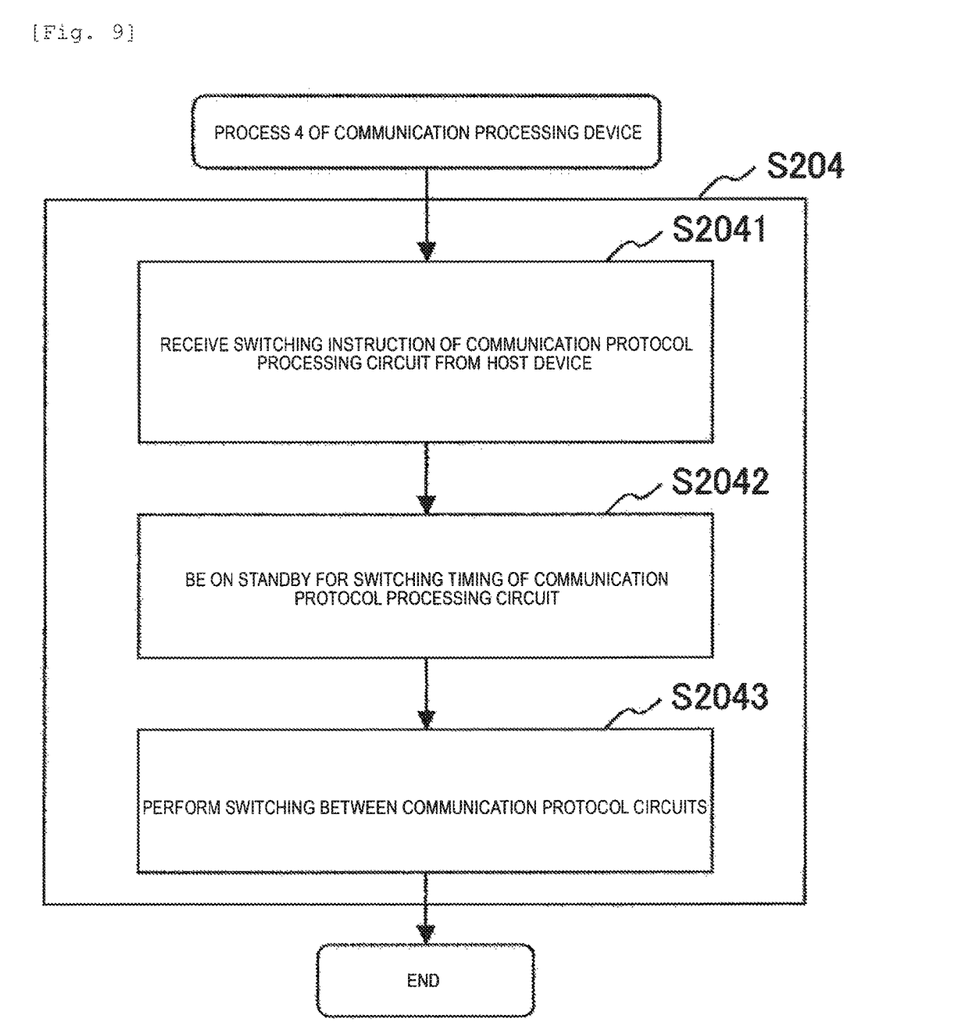
FIG. 9 is a flowchart of treatment 4 of the communication processing device in the update of the communication protocol process.

The communication processing device 2 performs the processing step S204 of FIG. 9, with respect to the processing step S104 of the host device 1. FIG. 9 is a flowchart of treatment 4 of the communication processing device, in the updating of the communication protocol process. In the processing step S2041 of FIG. 9, a switching instruction of the communication protocol processing circuit is received from the host device 1. In the processing step S2042, the communication processing device is on standby for the switching timing of the communication protocol processing circuit. In the processing step S2043, the switching between the communication protocol circuits is performed. This flow is executed by the output S15 of the register 22d of FIG. 3 acting as a switching timing signal, the switching control circuit 22c giving the output S7 to the switching circuit 22b on the input side, and the switching control circuit 22c giving the output S14 to the switching circuit 22h on the output side, and the subsequent process in the variable region 22R of the FPGA 22 is executed by using the communication processing circuit 22j which was a standby side as a main system, and with the communication processing circuit 22i which was the main system as a standby system. In this case, the communication protocol of the communication processing circuit 22j which was the standby side is replaced with the latest communication protocol from the host device 1, and it is assumed that the subsequent communication is performed by being reflected from the latest situation.

Figure 10:
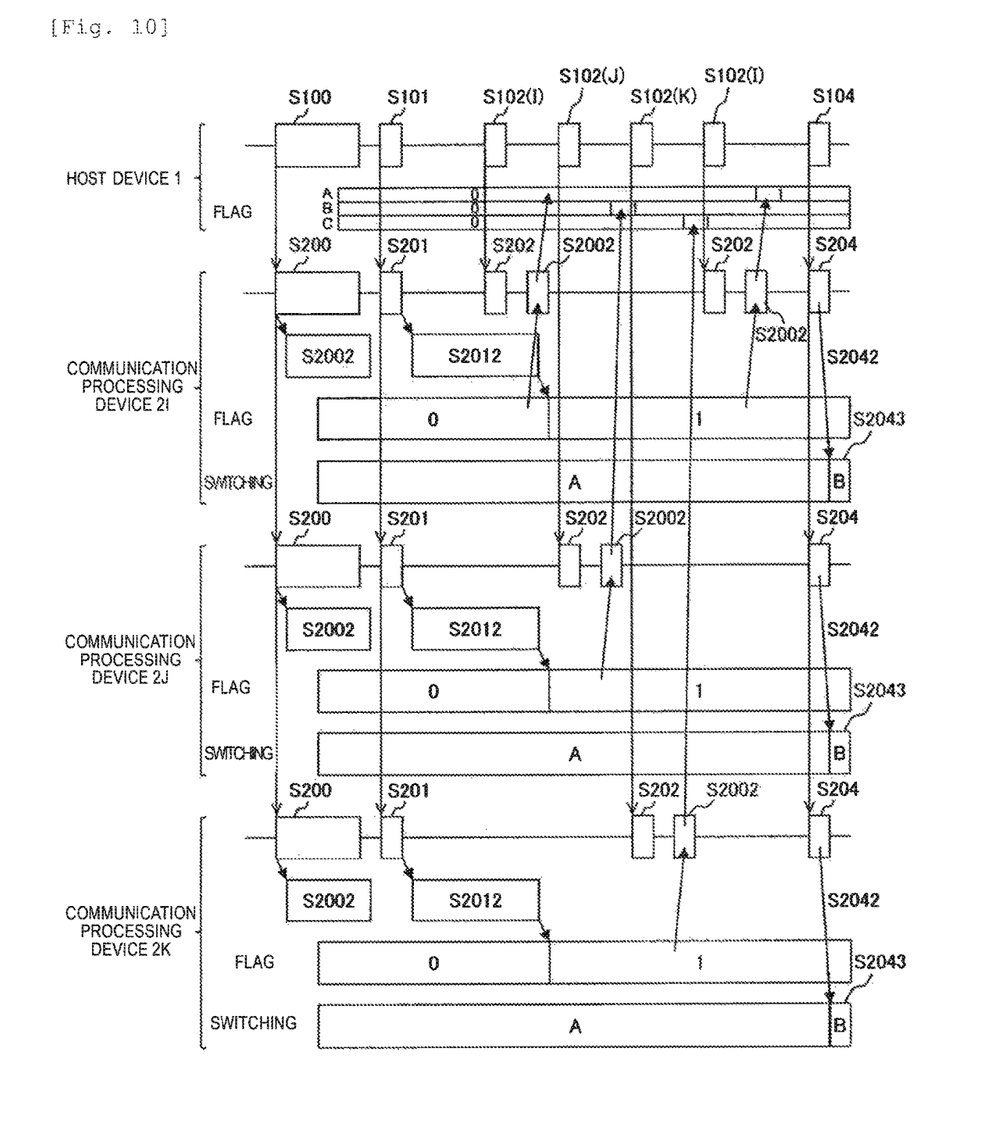
FIG. 10 is a timing chart between the host device and the communication processing device at the time of update of the communication protocol process.

FIG. 10 is a timing chart between the host device 1 and the communication processing device 2, in the updating of the communication protocol process. The reference numerals in the drawing correspond to the symbols of the processing steps of the flowchart of FIG. 5 to FIG. 9. Since there are a plurality of communication processing devices 2, the respective processes for three communication processing devices 2I, 2J, and 2K will be described.

In FIG. 10, the states of the host device 1 and the communication processing devices 2I, 2J, and 2K are illustrated in order from the top. Further, in FIG. 10, the execution periods of the processing steps of the flowcharts of FIG. 5 to FIG. 9, the flags, and the switching states are illustrated.

Here, flag "0" means a state in which the communication protocol of the communication processing circuit 22j which is the standby system is the initial value, here, a state of no information. Therefore, flag "1" means a state in which the communication protocol of the communication processing circuit 22j which is the standby system is updated. Further, switching "A" means the communication by the communication processing circuit 22i which is the standby system, and switching "B" means the communication by the communication processing circuit 22j which is the standby system. Further, in the state before changing work of the communication protocol is started, in a state in which the host device 1 and the communication processing devices 2I, 2J, and 2K are placed, the flag is "0", and switching is "A". After the flags of the communication processing devices 2I, 2J and 2K are recognized as "0", the host device 1 tries to perform the switching from the present.

First, the host device 1 transmits the FPGA circuit data of the communication protocol process to be updated to the communication processing devices 2I, 2J, and 2K in the processing step S100.

The communication processing devices 2I, 2J, and 2K each receive the FPGA circuit data of the communication protocol process to be updated from the host device 1 in the processing step S200, and write the FPGA circuit data to the flash memory in the processing step S2002.

The host device 1 instructs the communication processing devices 2I, 2J, and 2K to reconfigure the FPGA circuit in the processing step S101. The communication processing devices 2I, 2J, and 2K are instructed to reconfigure the FPGA circuit from the host device 1 in the processing step S201, read the FPGA circuit data from the flash memory 23 in the processing step S2012, and write the FPGA circuit data to the CRAM 22f. Further, subsequently, the logic circuit information is transmitted to the variable region 22R of the FPGA 22 as the output S21, is forwarded to the communication processing circuit 22j on the standby side in the variable region 22R, and is subjected to a writing process. In FIG. 10, the processing step S2012 is represented in a wide way, and this indicates that it takes time for this process.

Next, the host device 1 instructs the individual communication processing devices to perform work of reading the reconfiguration end flag of the FPGA circuit in the communication processing device in the processing step S102. FIG. 10 means that the communication processing device 2I is first instructed, and since this case is the timing when the process of the processing step S2012 has not been completed, the flag from the communication processing device 2I indicates "0". In addition, next, the flag "1" can be recognized in the process that is performed on the communication processing device 2J, and the flag "1" is also received from the communication processing device 2K in the same manner. The communication processing device 2I, which failed the first time, is successful in the subsequent second trial. In this manner, the communication processing devices 2I, 2J, and 2K receive the read reconfiguration end flag of the FPGA circuit from the host device 1 in the processing step S202, and transmit the flag to the host device 1 in the processing step S2002.

If all of the reconfiguration end flags that are read from the communication processing devices 2I, 2J, and 2K indicate end (the value is 1), the host device 1 instructs communication processing devices 2I, 2J, and 2K to switch the communication protocol processing circuit in the processing step S104. The communication processing devices 2I, 2J, and 2K receive the switching instruction of the communication protocol processing circuit from the host device 1 in the processing step S2041, are on standby for the switching timing of the communication protocol processing circuit in the processing step S2042, and rewrite the switching setting register from "A" to "B" in the processing step S2043.

Figure 11:
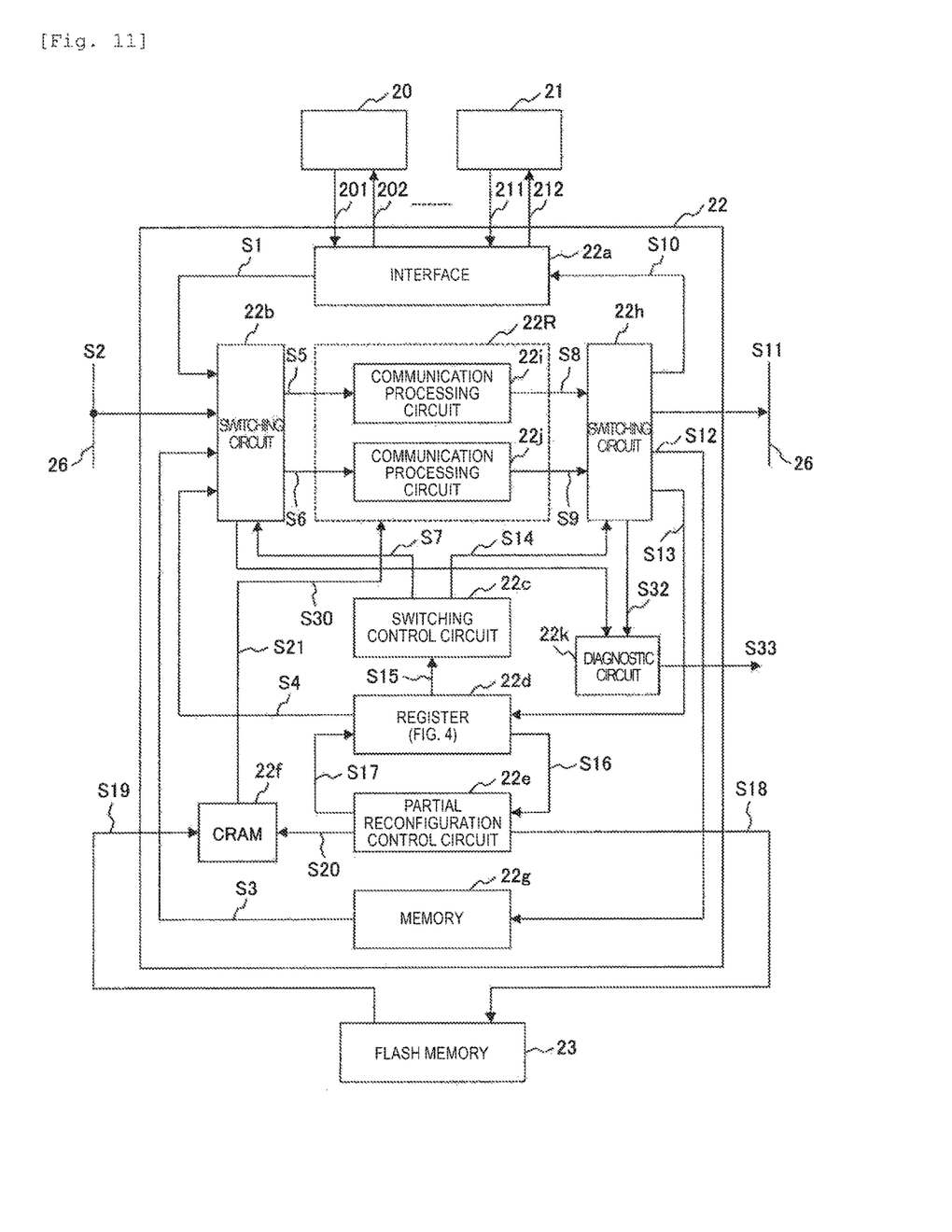
FIG. 11 is a block diagram of an FPGA provided with a diagnostic circuit, which is a configuration component of the communication processing device.

FIG. 11 illustrates a modification example of the present invention. Here, the FPGA 22 in FIG. 3 is configured to include a diagnostic circuit.

The diagnostic circuit 22k receives a part of the input of the communication processing circuit 22i or 22j that is in communication as a first diagnostic input S30 from the switching circuit 22b on the input side, receives a part of the output of the communication processing circuit 22i or 22j that is in communication as a second diagnostic input S32 from the switching circuit 22h on the output side, executes a diagnosis as to whether or not a communication process is performed correctly, and outputs the diagnosis result signal S33.

REFERENCE SIGNS LIST

1: HOST DEVICE
2: COMMUNICATION PROCESSING DEVICE
3: COMMUNICATION NETWORK
4: CONTROL DEVICE
S: SENSOR
A: ACTUATOR
20, 21: PORT
22: FPGA
22R: VARIABLE REGION
22i, 22j: COMMUNICATION PROCESSING CIRCUIT
22b, 22h: SWITCHING CIRCUIT
22a: INTERFACE
22c: SWITCHING CONTROL CIRCUIT
22d: REGISTER
22e: PARTIAL RECONFIGURATION CONTROL CIRCUIT
22f: CRAM
22g: MEMORY
23: FLASH MEMORY
24: CPU
25: MEMORY
26: BUS
200, 210: NETWORK INTERFACE
201, 211: INPUT INTERFACE

The invention claimed is:

1. A communication processing device which is connected to a communication network, and includes a programmable logic device in which partial rewriting of a logic circuit is possible, during an operation of a host device in the communication network,
wherein the programmable logic device includes
at least two communication processing circuits of which each performs a communication protocol process, and in which one communication processing circuit is operable due to switching, a first communication processing circuit performs communication, and a second communication processing circuit is on standby,
updating means for downloading logic circuit data of an updated communication protocol process, from the communication network, and performing a circuit configuration for the second communication processing circuit,
a flag that indicates whether or not the circuit configuration for the second communication processing circuit is finished, and by which a circuit configuration state is able to be read to the host device side through communication, and
a register that is intended for switching to any one communication processing circuit to be used, and is writable from the host device side through communication.

2. The communication processing device according to claim 1,
wherein in a case of changing the content of a register for switching the communication processing circuit, switching between the communication processing circuits is not performed during a communication process with the host device, and the switching is performed at a timing when the communication process is completed.

3. The communication processing device according to claim 1,
wherein a diagnosis function of diagnosing whether or not a communication protocol process is correctly performed, by comparing a part of an input signal and a part of an output signal of the communication processing circuit which is in use.

4. A communication method of a communication system including a plurality of the communication processing devices according to claim 1 which are connected to the communication network,
wherein a host device which is connected to one of the communication processing devices, and controls a communication protocol process change of the communication processing circuit
transmits logic circuit data of an updated communication protocol process, to another communication processing device,
transmits a partial rewriting instruction of logic circuit data which is transmitted to the programmable logic device,
reads a flag indicating whether partial rewriting is finished, from the programmable logic device, and
checks that the partial rewriting is finished in all of the programmable logic devices, and performs a setting of using an updated communication protocol processing circuit, for all of the programmable logic devices, through communication.

5. A communication system in which a host device and a control device are connected through a communication processing device, on a communication network,
wherein the communication processing device includes a programmable logic device in which partial rewriting of a logic circuit is possible, during an operation of the host device, and
wherein the programmable logic device includes
at least two communication processing circuits of which each performs a communication protocol process, and in which one communication processing circuit is operable due to switching, a first communication processing circuit performs communication, and a second communication processing circuit is on standby,
updating means for downloading logic circuit data of an updated communication protocol process, from the communication network, and performing a circuit configuration for the second communication processing circuit, a flag that indicates whether or not the circuit configuration for the second communication processing circuit is finished, and by which a circuit configuration state is able to be read to the host device side through communication, and a register that is intended for switching to any one communication processing circuit to be used, and is writable from the host device side through communication.

* * * * *